United States Patent
Gradle

(10) Patent No.: US 11,441,696 B2
(45) Date of Patent: Sep. 13, 2022

(54) CONTINUOUS TILT ANGLE INDICATOR FOR A SWING OR TILTING DISK CHECK VALVE

(71) Applicant: Flowserve Management Company, Irving, TX (US)

(72) Inventor: Richard J. Gradle, Garner, NC (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 17/296,134

(22) PCT Filed: Nov. 21, 2019

(86) PCT No.: PCT/US2019/062597
§ 371 (c)(1),
(2) Date: May 21, 2021

(87) PCT Pub. No.: WO2020/117483
PCT Pub. Date: Jun. 11, 2020

(65) Prior Publication Data
US 2022/0010890 A1    Jan. 13, 2022

Related U.S. Application Data

(60) Provisional application No. 62/774,915, filed on Dec. 4, 2018.

(51) Int. Cl.
*F16K 37/00* (2006.01)
*F16K 15/03* (2006.01)
*F16K 27/02* (2006.01)

(52) U.S. Cl.
CPC .......... *F16K 37/0033* (2013.01); *F16K 15/03* (2013.01); *F16K 27/0227* (2013.01); *Y10T 137/8242* (2015.04)

(58) Field of Classification Search
CPC .... F16K 15/03; F16K 15/034; F16K 37/0041; F16K 1/20; F16K 1/2085; F16K 1/2092;
(Continued)

(56) References Cited

U.S. PATENT DOCUMENTS 3,914,994 A * 10/1975 Banner ...................... G01F 1/28
73/114.68
4,353,390 A * 10/1982 Karpenko ............... F16K 15/03
137/527.8
(Continued)

FOREIGN PATENT DOCUMENTS

JP        52032726 U    3/1977
JP        63145080 U    9/1988
(Continued)

OTHER PUBLICATIONS

International Search Report and Written Opinion for PCT Application No. PCT/US2019/062597 dated Mar. 9, 2020, 12 pages.
(Continued)

*Primary Examiner* — Robert K Arundale
(74) *Attorney, Agent, or Firm* — Maine Cernota & Rardin

(57) ABSTRACT

A sensing apparatus measures the disk tilt angle of a swing or tilting disk check valve without requiring penetration of the valve housing through a rotating shaft seal. A hinge pin extension is rotationally coupled to the valve disk, and a mechanical converter converts rotation thereof into translation of a magnet carrier within a non-magnetic extension of the valve housing. An LVDT core magnet is translated by the magnet carrier within the housing extension while surrounded by LVDT sensor coils mounted to the exterior of the housing extension. The LVDT core magnet and sensor coils thereby provide an LVDT output signal that indicates the tip angle of the valve disk. Embodiments include threaded coupling of the hinge pin extension to the magnet carrier, or coupling therebetween by a converter pin fixed to one of
(Continued)

them into angled helical slot of a cylinder fixed to the other of them.

20 Claims, 5 Drawing Sheets

(58) Field of Classification Search
CPC ......... Y10T 137/7898; Y10T 137/7903; Y10T 137/8225; Y10T 137/8242
See application file for complete search history.

(56) References Cited

U.S. PATENT DOCUMENTS

| | | | | |
|---|---|---|---|---|
| 4,669,500 | A * | 6/1987 | Strelow | F16K 15/03 137/514 |
| 4,777,979 | A * | 10/1988 | Twerdochlib | F16K 37/0041 137/554 |
| 4,805,665 | A * | 2/1989 | League | F16K 37/0041 116/277 |
| 6,216,727 | B1 | 4/2001 | Genova et al. | |
| 7,108,010 | B2 * | 9/2006 | Trentadue | F16K 15/03 137/527.8 |
| 2010/0152901 | A1 * | 6/2010 | Judge | E21B 33/062 700/275 |

FOREIGN PATENT DOCUMENTS

| | | |
|---|---|---|
| JP | 2001159505 A | 6/2001 |
| KR | 1020090032596 A | 4/2009 |

OTHER PUBLICATIONS

International Preliminary Report on Patentability for PCT Application No. PCT/US2019/062597 dated Jun. 17, 2021, 8 pages.

* cited by examiner

CONTINUOUS TILT ANGLE INDICATOR FOR A SWING OR TILTING DISK CHECK VALVE

RELATED APPLICATIONS

This application is a national phase application filed under 35 USC § 371 of PCT Application No. PCT/US19/62597 with an International filing date of Nov. 21, 2019. Application PCT/US19/62597 claims the benefit of U.S. Provisional Application No. 62/774,915, filed Dec. 4, 2018. Both of these applications are herein incorporated by reference in their entirety for all purposes.

FIELD OF THE INVENTION

The invention relates to fluid control check valves, and more particularly, to position indicators for swing and tilting disk check valves.

BACKGROUND OF THE INVENTION

Check valves are used for preventing unwanted, reverse flow of fluids in many fluid systems, such as those in chemical and power plants, and in many other industrial processes.

Typical applications in the nuclear industry are feed water control systems, dump lines, make-up water, miscellaneous process systems, N2 systems, and monitoring and sampling systems. In aircraft and aerospace, check valves are used where high vibration, large temperature extremes and corrosive fluids are present. For example, check valves are used for spacecraft and launch vehicle propulsion propellant control for reaction control systems (RCS) and Attitude Control Systems (ACS) and aircraft hydraulic systems.

Check valves are also frequently used when multiple gases are mixed into one gas stream. A check valve is installed on each of the individual gas streams to prevent mixing of the gases at the original source. For example, if a fuel and an oxidizer are to be mixed, then check valves will normally be used on both the fuel and oxidizer sources to ensure that the original gas cylinders remain pure and therefore nonflammable.

There are many different types of check valve, including ball check valves and diaphragm check valves. Check valves that include hinged, rotating closure elements, such as swing check valves and "tilting disk" check valves, are popular for many applications, including in the nuclear industry. The fundamental principle of swing and tilting disk check valves is that a closure element, often referred to as a "disk" although it may not actually be shaped as a disk, is suspended by a hinge within the body of the check valve, such that the closure element is able to pivot about the hinge in one direction so as to press against a valve seat and block fluid flow, and is also able to pivot in an opposite direction so as to swing away from the valve seat and allow fluid to pass.

It should be noted that the present invention applies to all check valves that include a hinged closure element, and that the terms "swing" check valve and "tilting disk" check valve are used herein generically to refer to all such check valves with hinged closure elements, except where the context requires otherwise.

With reference to FIGS. 1A and 1B, the hinge in a swing or tilting disk check valve is intentionally located "off center" on the disk 110, so that fluid pressure applied to one side of the disk tends to pivot the disk into a closed position, as shown in FIG. 1A, while pressure applied to the other side tents to pivot the disk into an open position, as shown in FIG. 1B. The off-center hinge also provides a gravitational bias to the valve, which can be used to set a minimum pressure differential for opening of the valve according to the weight of the disk 110, the degree to which the hinge is off-center, and how the valve is oriented. The hinge in a swing or tilting disk check valve typically includes a hinge pin 112, also referred to as a "pivot pin," that is supported by fixtures 116 within the valve and is fixed to the disk 110 and rotates with the disk 110.

Monitoring the tilt angle of the disk in a swing or tilting disk check valve can be important for ensuring that the valve is functioning properly, and can be useful for monitoring the flow rate within the valve, or for verifying that there is flow through the valve. One approach is to extend the hinge pin such that it penetrates the housing through a rotating shaft seal, and to attach an external indicator or sensor to the pivot pin external to the valve housing.

However, this approach has the disadvantage that a rotating shaft seal must be provided at the location where the pivot pin penetrates the valve housing. This requirement increases the risk of leakage, which can be unacceptable, especially where dangerous fluids are being controlled, as is often the case for example in the nuclear industry.

Accordingly, for many applications it is unacceptable to extend the pivot pin through a rotating shaft seal. Unfortunately, it can be very difficult in such cases to monitor the disk tilt angle of a swing or tilting disk check valve. In particular, it is impractical to provide electronic sensors and wireless transmitters within the valve housing, and it is generally impractical and cost-prohibitive to use an X-ray device, ultra-sound, or other such imaging device.

One approach is to provide a transparent window in the housing and optically monitor the position of the disk. However, in many cases this approach is also impractical, due to material and accessibility limitations, among other reasons.

Another approach is to attach a magnet to the disk or hinge pin within the check valve housing, and place one or more magnetically driven switches or magnetic field sensors, such as Hall Effect sensors, proximally outside of the housing so as to sense movement of the magnet as the valve opens and closes. This approach works reasonably well when only a very coarse measurement is needed, such as detecting the fully open and fully closed positions of the disk. However, magnetic switches and field sensors are typically unable to provide a continuous, linear indication of the rotational position of a disk within a non-intrusive swing check valve.

What is needed, therefore, is an apparatus for measuring the tilt angle of the disk in a swing or tilting disk check valve that provides a continuous, linear measurement of the tilt angle without requiring penetration of the valve housing through a rotating shaft seal, and without requiring design, manufacture, and optimization of a custom rotary encoder or other custom sensor.

SUMMARY OF THE INVENTION

The present invention is a sensing apparatus for measuring the tilt angle of the disk in a swing or tilting disk check valve that provides a continuous, linear measurement of the tilt angle without requiring penetration of the valve housing through a rotating shaft seal, and without requiring design, manufacture, and optimization of a custom rotary encoder or other custom sensor.

The disclosed sensing apparatus includes a hinge pin extension that is coupled to the hinge pin of the valve disk by a swing arm. The apparatus further includes a mechanical converter that is cooperative with the hinge pin extension and is configured to convert rotations of the hinge pin extension into linear translations of a magnet carrier. In some embodiments, the mechanical converter includes a threaded connection between the hinge pin extension and the magnet carrier. In other embodiments, the mechanical converter includes a converter pin fixed to the hinge pin extension that rides within angled helical slot provided in a hollow cylinder that is cooperative with the magnet carrier, or vice versa, thereby causing the magnet carrier to move translationally as the hinge pin extension rotates.

In addition, the disclosed apparatus includes a core magnet attached to the magnet carrier within an extension of the valve housing, and a corresponding coil set provided exterior to the housing extension, but proximal to the core magnet. The combined core magnet and coil set form a Linear Variable Differential Transformer (LVDT) that senses the linear position of the magnet carrier, and thereby provides a linear, continuous indication of the rotational position of the valve disk.

Embodiments of the disclosed sensing apparatus do not require design and fabrication of a custom LVDT. Instead, the sensing apparatus can be readily adapted to implement components of an LVDT that is commercially available and was not specifically designed for use with a check valve. In these embodiments, once a suitable LVDT is selected, all that is required is to fix the core magnet from the LVDT to the magnet carrier of the sensing apparatus, and to mount the coil of the LVDT onto the exterior of the housing extension, so that the housing extension of the swing check valve is positioned between the core magnet and LVDT coil assembly.

Rotation of the valve disk thereby causes the LVDT core magnet to move linearly within the coil assembly of the LVDT, such that the LVDT produces an electrical signal that is proportional to the tilt angle of the check valve disk. The LVDT output signal can be interpreted and displayed by any LVDT control and display apparatus known in the art, so as to provide an indication of the tilt angle of the valve disk, and can also be used for remote monitoring and recording of valve activity. In various applications, the invention thereby provides a tilt angle indication, condition monitoring, and verification of operability of the check valve.

According to the present invention, the valve housing extension that separates the LVDT coil set from the core magnet is made from a non-magnet material, which can be a plastic or a non-magnetic metal such as beryllium-copper or the austenitic nickel-chromium-based superalloy Inconel®. In embodiments, the modification of an existing swing or tilting disk check valve design requires only the extension of the valve housing to accommodate the hinge pin extension, magnet carrier, magnet, and external LVDT coils. Modification of an existing, previously manufactured swing or tilting disk check valve, in embodiments, requires only that a suitable hinge pin extension be coupled to the hinge pin of the check valve, and that the valve housing be extended by addition of a suitable housing extension combined with the other required components of the sensing apparatus.

Embodiments of the present invention can be implemented as modifications to existing valve designs during manufacture, and even as upgrades to existing, previously manufactured valves. In such cases, the existing valve or valve design must include a removable access plate or some other means whereby the hinge pin extension, which is external to the original housing, can be coupled to the hinge pin.

A first general aspect of the present invention is a continuous tilt angle sensing apparatus operable for measuring a tilt angle of a rotating closure element in a valve, the closure element being suspended by a hinge pin fixed to the closure element. The apparatus includes a housing extension physically cooperative with and sealed to the valve housing and having an interior within which the hinge pin of the closure element is accessible, a hinge pin extension located within the housing extension and mechanically cooperative with the hinge pin of the closure element, such that the hinge pin extension is caused to rotate when the closure element rotates, a mechanical converter located within the housing extension, the mechanical converter being cooperative with the hinge pin extension and with a magnet carrier, the mechanical converter being also located within the housing extension and being configured to mechanically convert rotation of the hinge pin extension into translational movement of the magnet carrier within the housing extension, a core magnet located within the housing extension and physically cooperative with the magnet carrier, and an LVDT coil set arranged external to the housing extension and located such that the core magnet is translated within the LVDT coil set when the closure element is rotated, the housing extension forming a non-magnetic barrier therebetween. The core magnet and LVDT coil set thereby operating together as a linear variable differential transformer that produces an LVDT output signal indicating a tilt angle of the closure element.

A second general aspect of the present invention is a valve that includes a rotating closure element suspended by a hinge pin fixed to the closure element, and a continuous tilt angle sensing apparatus according to the first general aspect.

A third general aspect of the present invention is a method for adapting a valve having a rotating closure element suspended by a hinge pin for continuous sensing of a tilt angle of the closure element, the closure element being configured to rotate about a hinge that includes a hinge pin fixed to the closure element. The method includes extending the housing surrounding the valve by adding a housing extension thereto, mechanically coupling a hinge pin extension to the hinge pin, so that the hinge pin extension is rotated within the housing extension when the closure element rotates, mechanically coupling a magnet carrier to the hinge pin extension by installing therebetween a mechanical converter configured to cause the magnet carrier to be translated within an interior of a non-magnetic sensing region of the housing extension when the hinge pin extension is rotated, fixing a core magnet to the magnet carrier within the housing extension, and fixing a set of LVDT coils to an exterior of the sensing region of the housing extension, so that the core magnet is translated within the LVDT coils when the hinge pin extension is rotated, the LVDT coils and core magnet being separated from each other by the non-magnetic sensing region of the housing extension. The core magnet and LVDT coils thereby operate together as a linear variable differential transformer that produces an LVDT output signal indicating a tilt angle of the closure element.

In embodiments, the method further includes obtaining an LVDT sensor assembly that was designed and manufactured without reference to the valve, the LVDT sensor assembly including an LVDT coil set and a core magnet, and configuring the housing extension and magnet carrier such that the core magnet and magnet carrier are able to translate within the interior of the sensing region and the LVDT coil set is able to surround the exterior of the sensing region.

In any of the preceding apparatus, valve, or method embodiments the valve can be a check valve. And in some of these embodiments the valve can be a swing valve or a tilting disk valve.

In any of the preceding apparatus, valve, or method embodiments the mechanical converter can cause the core magnet to be translated along a central axis of the hinge pin extension when the hinge pin extension is rotated.

In any of the preceding apparatus, valve, or method embodiments the mechanical converter can include a threaded coupling between the hinge pin extension and the magnet carrier, or the mechanical converter can includes a converter pin inserted into angled helical slot provided in a cylinder, where the converter pin is cooperative with the hinge pin extension or the magnet carrier, and the cylinder can be cooperative with the other of the hinge pin extension and the magnet carrier, one of the converter pin and cylinder being constrained from rotating while the other of the converter pin and cylinder is configured to rotate with the hinge pin extension.

And in any of the preceding apparatus, valve, or method embodiments the housing extension can be made of the austenitic nickel-chromium-based superalloy Inconel®.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2B is a cross sectional view of an embodiment of the present invention that includes threaded attachment of the hinge pin extension to the magnet carrier.

DETAILED DESCRIPTION

The present invention is a sensing apparatus for measuring the tilt angle of the disk in a swing or tilting disk check valve without requiring penetration of the valve housing through a rotating shaft seal. The disclosed invention provides a continuous, linear measurement of the tilt angle. Specifically, the invention incorporates elements from a Linear Variable Differential Transformer (LVDT) so as to measure the tilt angle of the disk.

It should be noted that the present invention applies to all check valves that include a hinged closure element, and that the terms "swing" check valve and "tilting disk" check valve are used herein generically to refer to all check valves having hinged closure elements, except where the context requires otherwise.

Figures 1A, 1B:
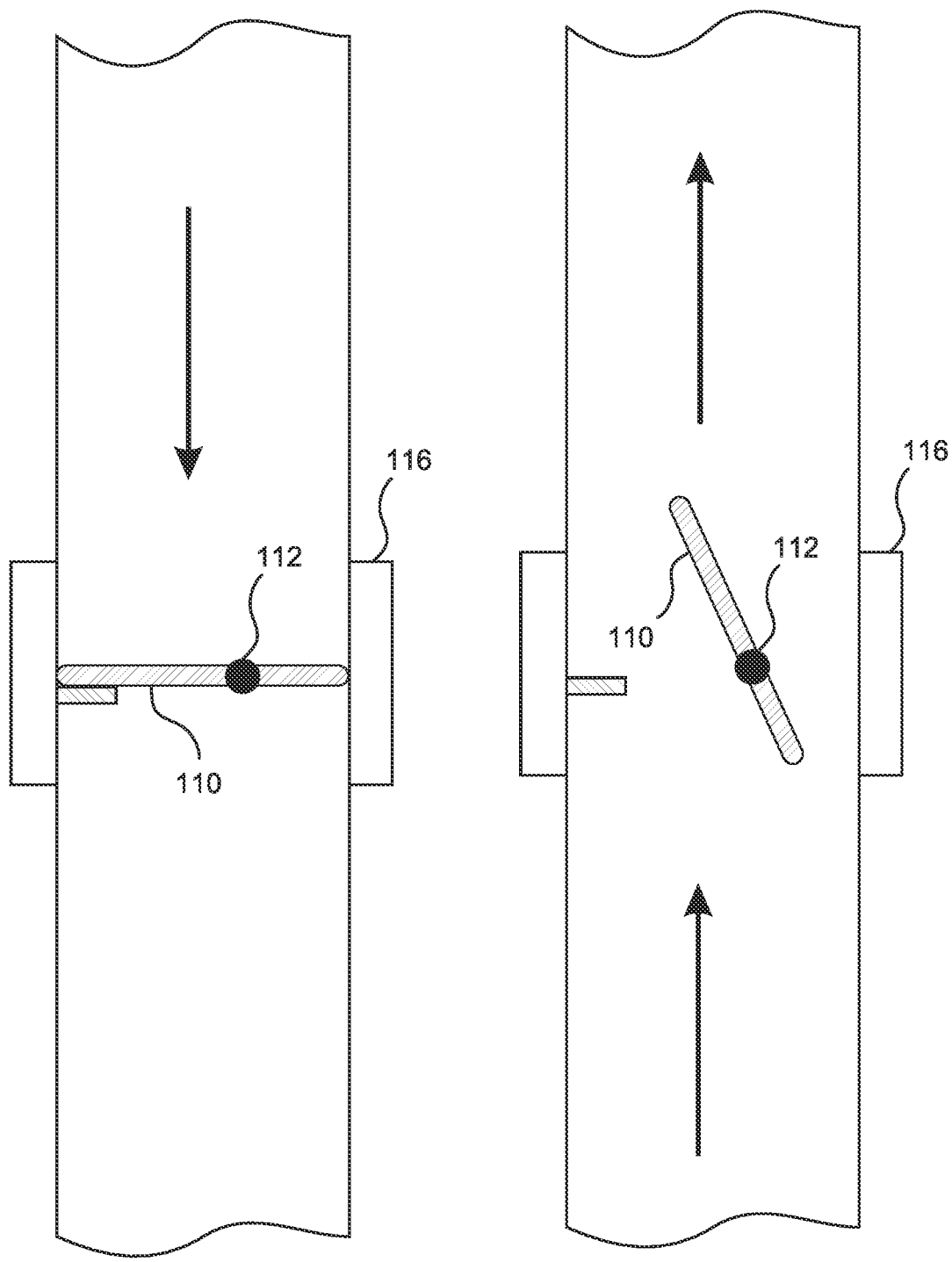
FIG. 1A is a cross-sectional side view of a tilting disk check valve of the prior art, shown with the cross-sectional plane perpendicular to the hinge pin, showing the valve closed.
Figure 1C:
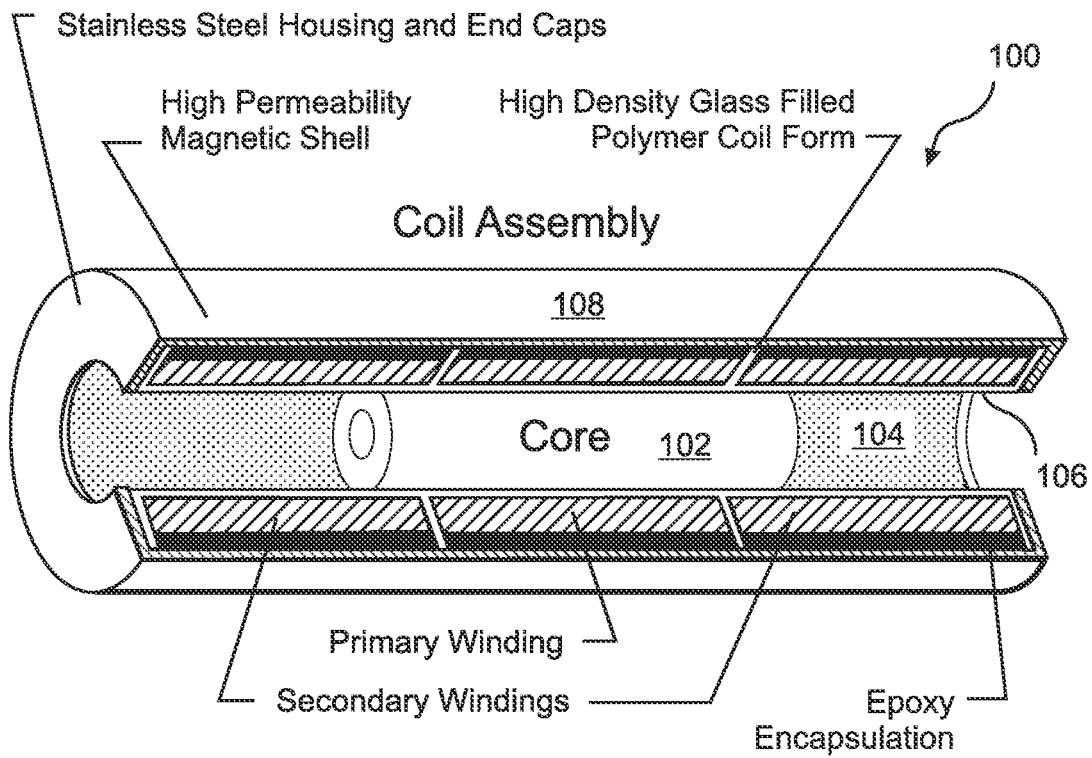
FIG. 1C is a perspective sectional view of an LVDT sensor of the prior art.

With reference to FIG. 1C, a conventional LVDT 100 comprises a core magnet 102 that is able to move translationally within a central space 104 that is surrounded by a set of fixed coils 106 enclosed within a coil housing 108. The set of fixed coils 106 includes a central "primary winding" flanked by a pair of "secondary" windings that are symmetrically spaced about the primary winding. The core magnet 102 is significantly shorter than the coils of the coil set 106, such that there is a variable overlap of the core magnet 102 with the coil windings 106 as the core magnet moves within the central space 104.

In operation, an LVDT controller (not shown) applies alternating current to the primary winding. Due to mutual inductance, this "primary" AC current generates secondary AC currents in the secondary windings. Since the mutual inductance between the primary and secondary windings is mediated by the core magnet 102, changes in the position of the core magnet 102 within the central space 104 result in changes of the relative amplitudes of the secondary AC currents generated in the two secondary coils. The electrical output signal of the LVDT 100 is the differential AC voltage between the two secondary windings, which varies with the axial position of the core magnet 102 within the LVDT coil set 106.

Figure 1D:
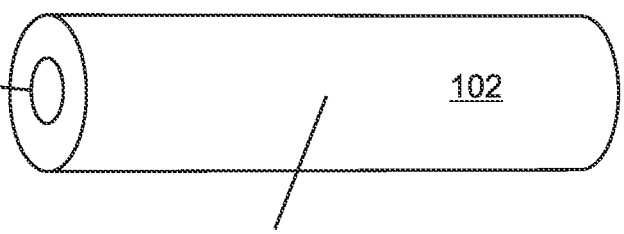
FIG. 1D is a perspective view of the core magnet of the LVDT sensor of FIG. 1A;\

FIG. 1D is a close-up perspective view of the core magnet 102 of FIG. 1C.

Figure 2A:
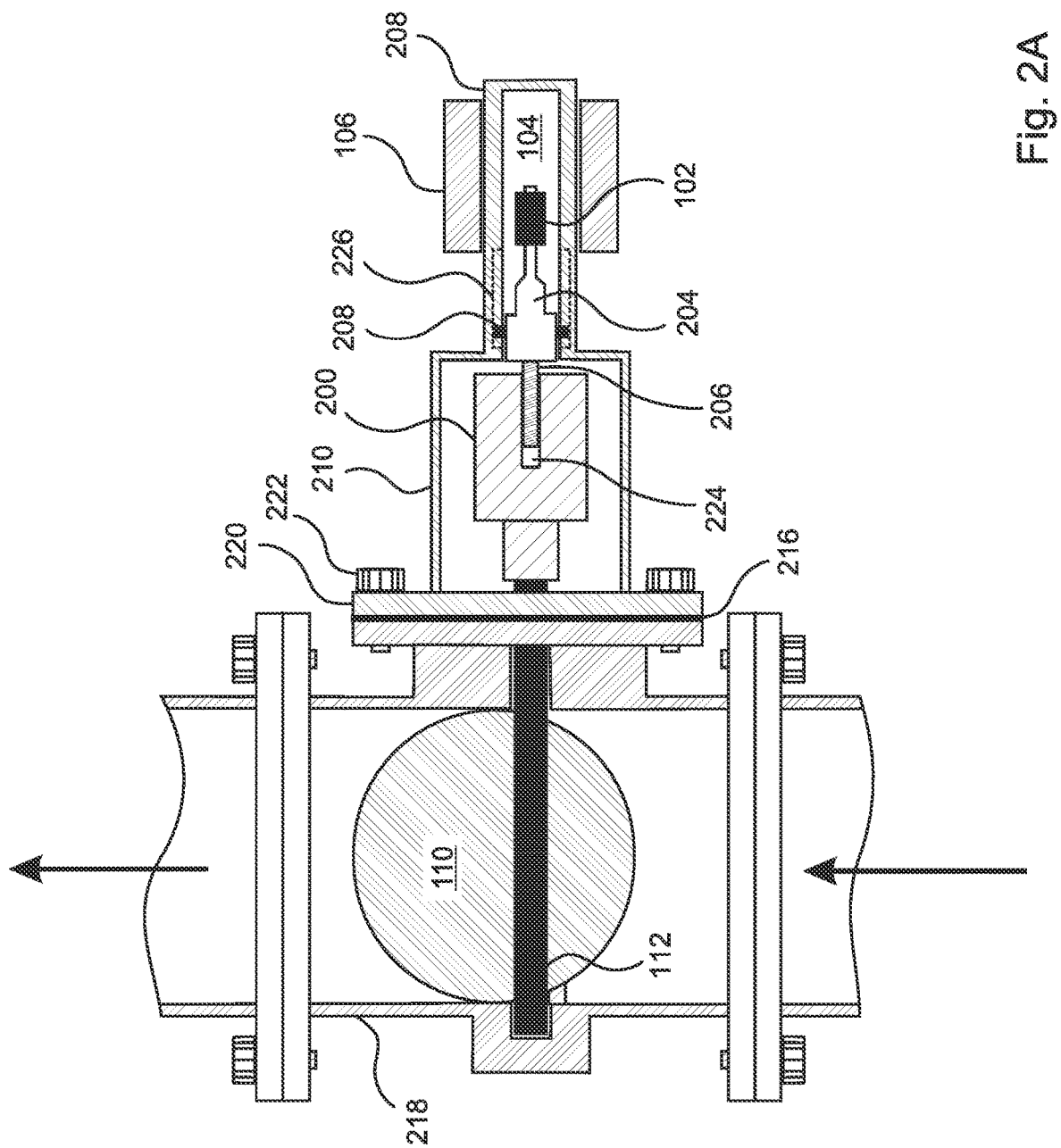
FIG. 2A is a cross-sectional illustration of an embodiment of the present invention implemented on a tilting disk check valve.
Figure 2B:
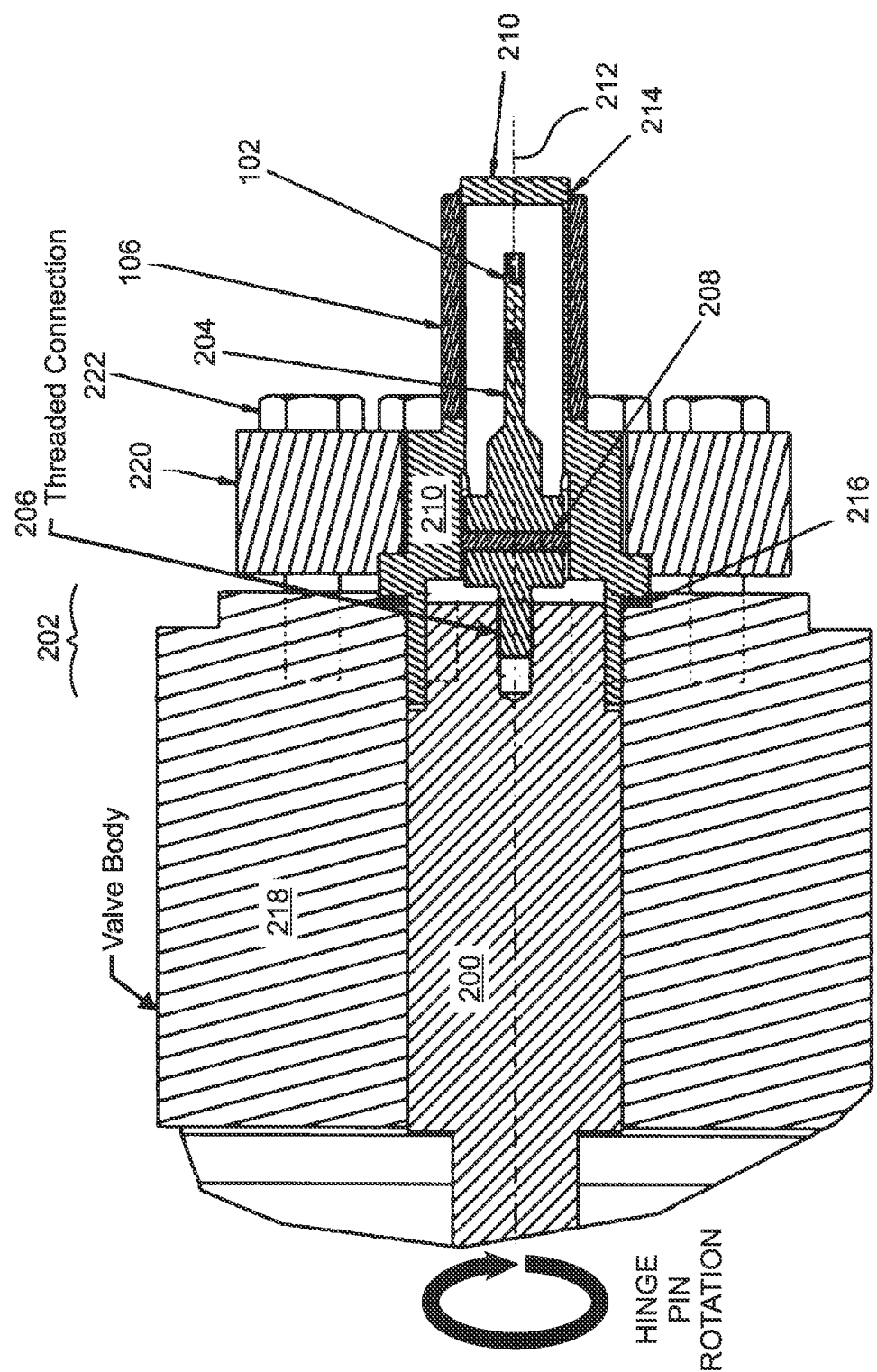
FIG. 2B is a cross-sectional illustration of the check valve of FIG. 1A, shown with the valve open.

With reference to FIGS. 2A and 2B, a check valve includes a rotating closure element 110, which in FIG. 2A is a tilting disk 110, that is suspended by a hinge pin 112. The valve itself is surrounded by a housing 218, to which a housing extension 210 is attached and sealed. Removal of the housing extension 210 renders the hinge pin 112 accessible, so that a hinge pin extension 200 can be attached to the hinge pin 112, causing the hinge pin extension 200 to rotate together with the hinge pin 112 and the disk 110.

The apparatus further includes a mechanical converter 202 that is cooperative with the hinge pin extension 200 and is configured to convert rotation of the hinge pin extension 200 into linear translation of a magnet carrier 204. In the embodiment of FIG. 2, the mechanical converter 202 includes a threaded connection 202 between the hinge pin extension and the magnet carrier. The illustrated embodiment further includes a converter pin 208 that is pressed into the magnet carrier 204 and engages in slots 226 in the pressure housing 210, also referred to herein as the housing extension 210, which functions as an extension of the valve housing 218 and surrounds the magnet carrier 204. The action of the converter pin 208 in the slots 226 prevents the magnet carrier 204 from rotating around the axial centerline 212 of the hinge pin 200.

When the hinge pin 200 rotates, the action of the threaded connection 206 between the hinge pin 200 and the magnet carrier 204 causes the magnet carrier 204 to translate back and forth along the hinge pin axial centerline 212. The LVDT core magnet 102 is attached to the magnet carrier 204, so that as the valve disk rotates, the core magnet 102 is translated within the housing extension 210 along the hinge pin centerline 212, with the amount of translation being directly proportional to the amount of disk rotation. The LVDT coils 106 are located on an outside diameter of the pressure housing 210, while the core magnet 102 translates inside the housing extension 210. The movement of the core magnet 102 thereby causes the LVDT sensor coils 106 to produce a signal voltage that is directly proportional to the tilt angle of the valve disk. The LVDT output signal can be interpreted and displayed by any LVDT control and display apparatus known in the art so as to provide an indication of the tilt angle of the valve disk, as well as for remote monitoring and recording. In various applications, the invention thereby provides a disk tilt angle indication, monitoring of the fluid flow rate through the valve, and verification of operability of the check valve.

According to the present invention, the housing extension 210 that surrounds the magnet carrier 204 is made from a non-magnet material, which can be a plastic or a non-magnetic metal such as beryllium-copper or the austenitic nickel-chromium-based superalloy Inconel®. In the embodiment of FIG. 2B, the housing extension 210 is made from Inconel®, which is a non-magnetic, high strength material. The high strength of Inconel® allows the housing extension 210 to be fabricated with relatively thin walls. A retaining ring 214 retains the LVDT coils 106 on the outside of the housing extension 210, while a gasket 216 seals the housing extension 210 to the valve housing 218. A retainer 220 and retainer bolting 222 hold the housing extension 210 in place, and provide the required compression load to the gasket 216.

Embodiments of the disclosed sensing apparatus do not require design and fabrication of a custom LVDT. Instead, the sensing apparatus can be readily adapted to implement components of an LVDT that is commercially available and not specifically designed for use with a check valve. In these embodiments, once an LVDT is selected, all that is required is to prepare a compatible housing extension 210 and magnet carrier 204, fix the core magnet 102 to the magnet carrier 204, and mount the windings 106 of the LVDT 100 to the exterior of the housing extension 210, so that the housing extension 210 is positioned between the core magnet 102 and the LVDT coil windings 106.

Figure 3:
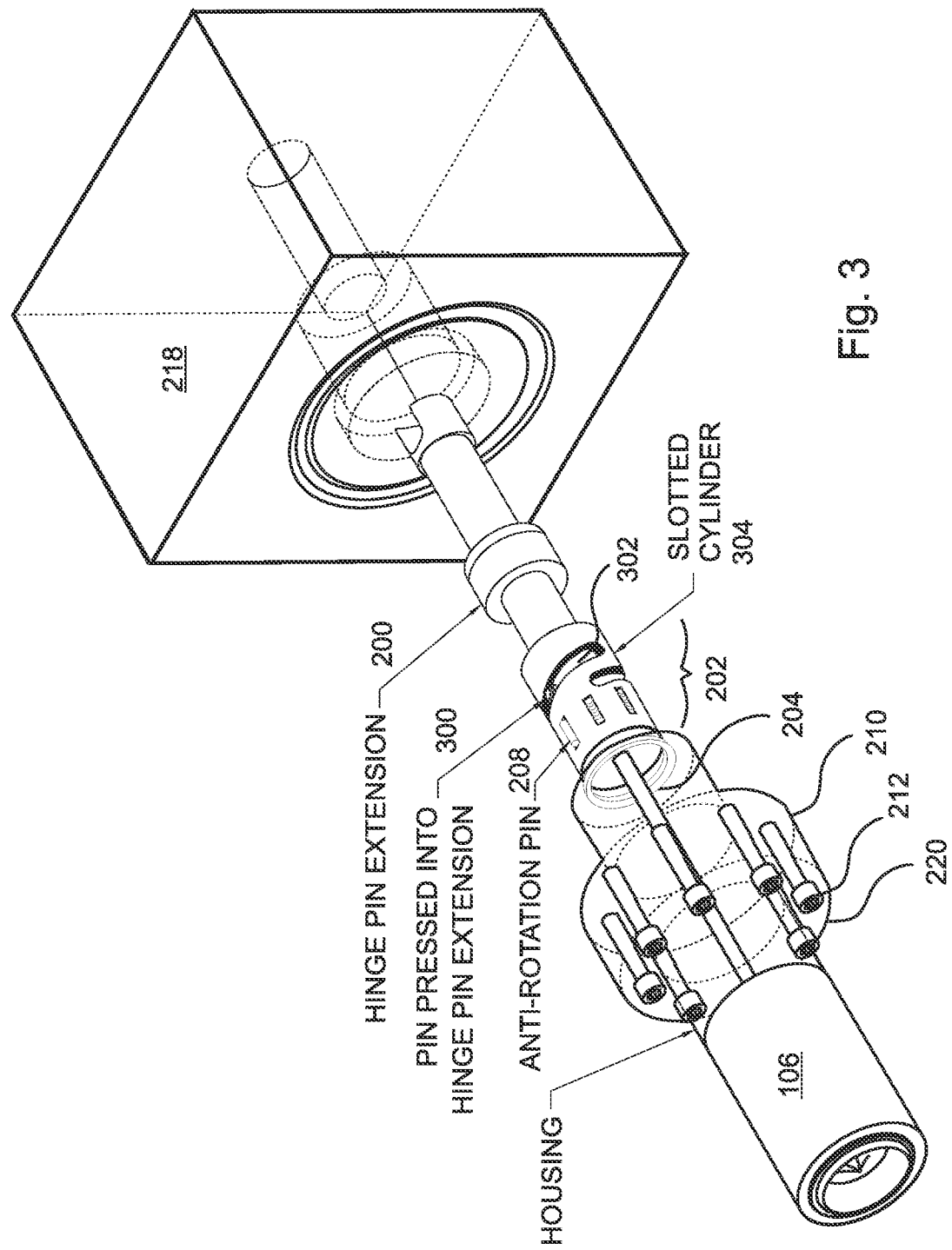
FIG. 3 is an exploded view of an embodiment of the present invention that includes attachment of the hinge pin extension to the magnet carrier by insertion of a converter pin fixed to the hinge pin extension into angled helical slot provided in a cylinder fixed to the magnet carrier.

With reference to FIG. 3, in similar embodiments the mechanical converter 202 includes a converter pin 300 fixed to the hinge pin extension 200 that rides within angled helical slot 302 provided in a hollow cylinder 304 that is cooperative with the magnet carrier 204, or vice versa, thereby causing the magnet carrier 204 to move translationally as the hinge pin extension 200 rotates.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

I claim:

1. A continuous tilt angle sensing apparatus operable for measuring a tilt angle of a rotating closure element in a valve, the closure element being suspended by a hinge pin fixed to the closure element, the apparatus comprising:
   a housing extension physically cooperative with and sealed to a valve housing the housing extension having an interior within which the hinge pin of the closure element is accessible;
   a hinge pin extension located within the housing extension and mechanically cooperative with the hinge pin of the closure element, such that the hinge pin extension is caused to rotate when the closure element rotates;
   a mechanical converter located within the housing extension, the mechanical converter being cooperative with the hinge pin extension and with a magnet carrier, the mechanical converter being also located within the housing extension and being configured to mechanically convert rotation of the hinge pin extension into translational movement of the magnet carrier within the housing extension;
   a core magnet located within the housing extension and physically cooperative with the magnet carrier; and
   a linear variable differential transformer (LVDT) coil set arranged external to the housing extension and located such that the core magnet is translated within the LVDT coil set when the closure element is rotated, the housing extension forming a non-magnetic barrier therebetween,
   the core magnet and LVDT coil set thereby operating together as a linear variable differential transformer that produces an LVDT output signal indicating a tilt angle of the closure element.

2. A valve comprising:
   a rotating closure element suspended by a hinge pin fixed to the closure element; and
   a continuous tilt angle sensing apparatus according to claim 1.

3. A method for adapting a valve having a rotating closure element suspended by a hinge pin for continuous sensing of a tilt angle of the closure element, the closure element being configured to rotate about a hinge that includes a hinge pin fixed to the closure element, the method comprising:
   extending a housing surrounding the valve by adding a housing extension thereto;
   mechanically coupling a hinge pin extension to the hinge pin, so that the hinge pin extension is rotated within the housing extension when the closure element rotates;
   mechanically coupling a magnet carrier to the hinge pin extension by installing therebetween a mechanical converter configured to cause the magnet carrier to be translated within an interior of a non-magnetic sensing region of the housing extension when the hinge pin extension is rotated;
   fixing a core magnet to the magnet carrier within the housing extension; and
   fixing a set of LVDT coils to an exterior of the sensing region of the housing extension, so that the core magnet is translated within the LVDT coils when the hinge pin extension is rotated, the LVDT coils and core magnet being separated from each other by the non-magnetic sensing region of the housing extension, the core magnet and LVDT coils thereby operating together as a linear variable differential transformer that produces an LVDT output signal indicating a tilt angle of the closure element.

4. The method of claim 3, wherein the method further comprises:
obtaining an LVDT sensor assembly that was designed and manufactured without reference to the valve, the LVDT sensor assembly including an LVDT coil set and a core magnet; and
configuring the housing extension and magnet carrier such that the core magnet and magnet carrier are able to translate within the interior of the sensing region and the LVDT coil set is able to surround the exterior of the sensing region.

5. The apparatus of claim 1, wherein the valve is a check valve.

6. The apparatus of claim 1, wherein the valve is a swing valve or a tilting disk valve.

7. The apparatus of claim 1, wherein the mechanical converter causes the core magnet to be translated along a central axis of the hinge pin extension when the hinge pin extension is rotated.

8. The apparatus of claim 1, wherein the mechanical converter includes a threaded coupling between the hinge pin extension and the magnet carrier.

9. The apparatus of claim 1, wherein the mechanical converter includes a converter pin inserted into an angled helical slot provided in a cylinder:
the converter pin being cooperative with one of the hinge pin extension and the magnet carrier, and the cylinder being cooperative with the other of the hinge pin extension and the magnet carrier,
one of the converter pin and cylinder being constrained from rotating while the other of the converter pin and cylinder is configured to rotate with the hinge pin extension.

10. The apparatus of claim 1, wherein the housing extension is made of the austenitic nickel-chromium-based superalloy Inconel®.

11. The valve of claim 2, wherein the valve is a check valve.

12. The valve of claim 2, wherein the valve is a swing valve or a tilting disk valve.

13. The valve of claim 2, wherein the mechanical converter causes the core magnet to be translated along a central axis of the hinge pin extension when the hinge pin extension is rotated.

14. The valve of claim 2, wherein the mechanical converter includes a threaded coupling between the hinge pin extension and the magnet carrier.

15. The valve of claim 2, wherein the mechanical converter includes a converter pin inserted into an angled helical slot provided in a cylinder:
the converter pin being cooperative with one of the hinge pin extension and the magnet carrier, and the cylinder being cooperative with the other of the hinge pin extension and the magnet carrier; and
one of the converter pin and cylinder being constrained from rotating while the other of the converter pin and cylinder is configured to rotate with the hinge pin extension.

16. The method of claim 3, wherein the valve is a check valve.

17. The method of claim 3, wherein the valve is a swing valve or a tilting disk valve.

18. The method of claim 3, wherein the mechanical converter causes the core magnet to be translated along a central axis of the hinge pin extension when the hinge pin extension is rotated.

19. The method of claim 3, wherein the mechanical converter includes a threaded coupling between the hinge pin extension and the magnet carrier.

20. The method of claim 3, wherein the mechanical converter includes a converter pin inserted into an angled helical slot provided in a cylinder:
the converter pin being cooperative with one of the hinge pin extension and the magnet carrier, and the cylinder being cooperative with the other of the hinge pin extension and the magnet carrier; and
one of the converter pin and cylinder being constrained from rotating while the other of the converter pin and cylinder is configured to rotate with the hinge pin extension.

* * * * *